United States Patent

Hoffman, Jr. et al.

[15] 3,681,623

[45] Aug. 1, 1972

[54] GEOMETRIC CURRENT AMPLIFIER

[72] Inventors: Harry S. Hoffman, Jr., Saugerties; Jerry Saia, Kingston, both of N.Y.

[73] Assignee: International Business Machines Corporation, Armonk, N.Y.

[22] Filed: Dec. 31, 1970

[21] Appl. No.: 103,324

Related U.S. Application Data

[63] Continuation of Ser. No. 716,278, March 15, 1968, abandoned.

[52] U.S. Cl. ......................307/297, 307/313, 323/4, 323/22 T, 330/24

[51] Int. Cl. ..............................................H03k 1/12

[58] Field of Search ........307/296, 297, 313; 330/24, 330/30 D; 323/1, 4, 22 T

[56] References Cited

UNITED STATES PATENTS

| | | | |
|---|---|---|---|
| 3,529,256 | 9/1970 | Crabbe | 330/30 P X |
| 3,392,344 | 7/1968 | Meacham | 330/24 |
| 3,508,081 | 4/1970 | Matsuda | 307/255 |
| 3,390,306 | 6/1968 | White | 317/22 |

OTHER PUBLICATIONS

Stern, " Basic Approaches to Integrated Circuit Design," Motorola Monitor, Vol. 2, No. 2, June 1964, p. 15.

*Primary Examiner*—Donald D. Forrer
*Assistant Examiner*—R. C. Woodbridge
*Attorney*—Hanifin & Jancin and Nathan Cass

[57] ABSTRACT

A three terminal circuit comprised of two semiconductor transistors of opposite polarity types and two semiconductor diodes. These semiconductors are interconnected so as to provide positive regenerative feedback in a manner which permits achieving highly stable, temperature insensitive circuit characteristics which can be made independent of circuit parameters. The circuit requires no resistors, capacitors or inductors and may be used with particular advantage in integrated circuit form. Use of the circuit as an impedance converter, current generator, voltage regulator and differential amplifier are illustrated.

10 Claims, 11 Drawing Figures

INVENTORS
HARRY S. HOFFMAN JR
JERRY SAIA
BY Nathan Cass
ATTORNEY

GEOMETRIC CURRENT AMPLIFIER

This is a continuation of application Ser. No. 716,278 filed Mar. 15, 1968, now abandoned.

The present invention relates generally to electronic circuit arrangements, and more particularly to a novel electronic circuit having unusual performance capabilities which permit highly advantageous use of the circuit for a wide variety of applications, including, for example, impedance conversion, current generation, voltage regulation, and amplification. The circuit is also particularly advantageous for use in integrated circuits.

It is a broad object of the invention to provide a novel electronic circuit arrangement.

A more specific object of the invention is to provide a novel electronic circuit arrangement useful for a wide variety of applications, and which is of particular advantage for use in the form of an integrated circuit.

Another object of the invention is to provide the aforementioned electronic circuit using only elements that can be fabricated from semiconductors.

Still another object of the invention is to provide an impedance converter, a current generator, a voltage regulator and an amplifier, using the aforementioned electronic circuit.

Yet another object of the invention is to provide an electronic circuit in accordance with the foregoing objects which is capable of high frequency operation.

A further object of the invention is to provide an electronic circuit in accordance with the foregoing objects having a high degree of stability and temperature insensitivity.

An additional object of the invention is to provide a cascaded combination of a plurality of the aforementioned electronic circuits, whereby even greater performance capability is provided.

Briefly, the invention basically comprises a three terminal circuit comprised of two semiconductor transistors of opposite polarity types and two semiconductor diodes. No resistors, capacitors or inductors are required in the circuit. The transistors and diodes are interconnected so as to provide positive regenerative feedback in a manner which produces circuit operating characteristics that are of significant value for a wide range of applications.

The foregoing and other objects, features and advantages of the invention will be apparent from the following more particular description of the preferred embodiments of the invention, as illustrated in the accompanying drawings.

FIG. 1 illustrates the basic circuit in accordance with the invention.

FIGS. 1*a*, 1*b* and 1*c* illustrate alternative ways of forming the transistors and diodes in FIG. 1.

Like numerals designate like elements throughout the figures of the drawings.

Figure 1:
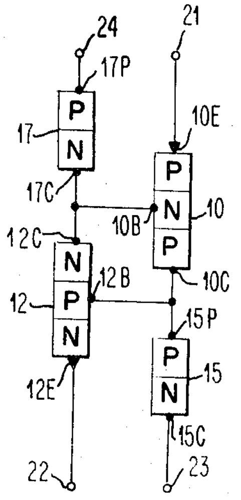

With reference to FIG. 1 it will be seen that the circuit of the invention basically comprises two semiconductor transistors 10 and 12 of opposite polarity types and two semiconductor diodes 15 and 17. Each of transistors 10 and 12 has its base connected to the collector of the other transistor and its emitter connected to a respective one of terminals 21 and 22. That is, the base 10B of transistor 10 is connected to the collected 12C of transistor 12, the base 12B of transistor 12 is connected to the collector 10C of transistor 10, the emitter 10E of transistor 10 is connected to terminal 21, and the emitter 12E of transistor 12 is connected to terminal 22. Also, diode 15 has its plate 15P connected to the collector 10C of transistor 10 and the base 12B of transistor 12, and its cathode 15C connected to terminal 23; diode 17 has its cathode 17C connected to the collector 12C of transistor 12 and the base 10B of transistor 10, and its plate 17P connected to terminal 24.

Figure 1A:
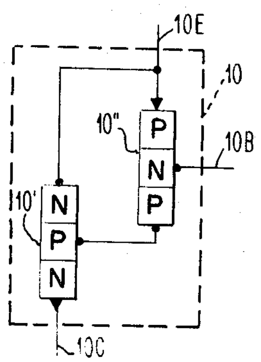
Figure 1B:
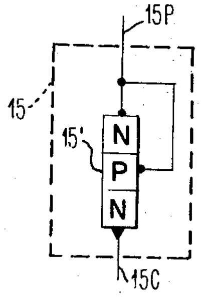
Figure 1C:
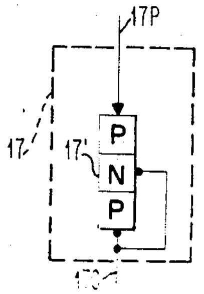

Transistors 10 and 12 may typically be PNP and NPN silicon junction transistors, and diodes 15 and 17 may typically be PN silicon junction diodes. These may be provided as discrete components or, more preferably, may be formed using silicon monolithic integrated circuit techniques which permit achieving additional advantages, as will become evident hereinafter. It is to be understood that each transistor or diode may also be provided in either discrete or integrated form by an appropriate combination and/or connection of semiconductor elements. For example, FIG. 1*a* shows how transistor 10 may be formed by the combination of an NPN transistor 10′ and a PNP transistor 10″, the collector and base of transistor 10′ being respectively connected to the emitter and collector of transistor 10″. As other examples, FIG. 1*b* shows how diode 15 may be provided by an NPN transistor 15′ having its collector and base connected together, and FIG. 1*c* shows how diode 17 may be provided by a PNP transistor 17′ having its collector and base connected together.

Figure 2:
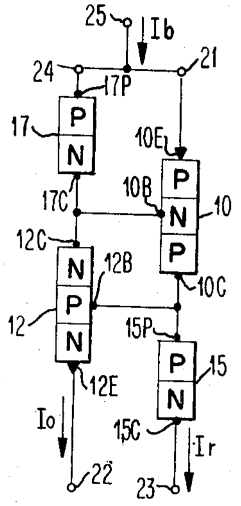
FIGS. 2 and 3 illustrate two ways in which the circuit of Fig. 1 may be connected to external circuitry.
Figure 3:
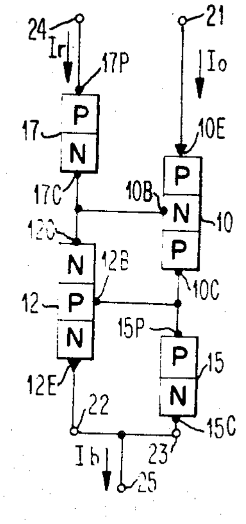

The circuit of FIG. 1 may be connected to external circuitry in either of the ways illustrated in FIGS. 2 and 3, depending on the direction of current flow desired for currents $Ib$, $Ir$ and $Io$ with respect to terminals 21 to 25. In FIG. 2, terminals 21 and 24 are connected together and to terminal 25 so that current $Ib$ flows into the circuit, while currents $Io$ and $Ir$ flow out from the circuit. In FIG. 3, terminals 22 and 23 are connected together and to terminal 25 so that current $Ib$ flows out of the circuit, while currents $Io$ and $Ir$ flow into the circuit.

Before describing how the novel circuit of the invention may advantageously be employed in a number of preferred embodiments, it will be useful to define a factor K for the circuit which is important in determining its operating characteristics in these embodiments. The factor K for the circuit of FIG. 2 may be expressed by the relationship:

$$K=\frac{AT1}{AD1}\,a1a2\,\frac{1}{1+\dfrac{AT1}{AD1}\,\dfrac{a1}{b1}}-\frac{a2}{b2}$$

where $AT\,1$ and $AD\,1$ are the respective effective areas of the emitter-base PN junction of transistor 10 and the PN junction of diode 17, $a$ 1 and $a$ 2 are the respective collector-tonemitter current amplification factors of transistors 10 and 12 (i.e., the "alphas" of the transistors) and $b$ 1 and $b$ 2 are the respective collector-to-base amplification factors of transistors of transistors 10 and 12 (i.e., the "betas" of the transistors).

In a similar way, the factor $K$ for the circuit of FIG. 3 may be expressed by the relationship:

$$K=\frac{AT2}{AD2}\,a1a2\,\frac{1}{1+\dfrac{AT2}{AD2}\dfrac{a2}{b2}}-\frac{a1}{b1}$$

where $AT$ 2 and $AD$ 2 are the respective effective areas of the emitter-base PN junction of transistor 12 and the PN junction of diode 15, and $a$ 1, $a$ 2, $b$ 1 and $b$ 2 are as previously defined.

Considering the above equation for $K$ for the circuit of FIG. 2, it will be understood that, if transistors 10 and 12 are chosen to have $a$ 1 and $a$ 2 values close to 1 (for example, greater than 0.98 ) and $b$ 1 and $b$ 2 values relatively large (for example, greater than 50 ), the above equation for $K$ may be approximated by the relationship:

$$k=AD1/AD1$$

The above approximation for $K$ is significant because it shows that, to a first approximation, the value of $K$ can be considered dependent only on the ratio $AT1/AD1$ of the areas of the junctions of transistor 10 and diode 17, which can be made highly stable and temperature insensitive over a wide frequency range, particularly where the circuit is provided in integrated circuit form. The same considerations apply to the equation for $K$ for the circuit of FIG. 3 which, by the above choice of values for $a1$, $a2$, $b1$ and $b2$, permits $K$ to be approximated by the relationship:

$$K=AT2/AD2$$

The basic operation of the novel circuit of the invention will now be described using the circuit of FIG. 2 as an example; it will be understood that the circuit of FIG. 3 operates in a like manner. For the purpose of this description, it will be assumed that current I$o$ begins to increase to a new value, as may occur, for example, because of a change in the external circuit connected to terminal 22. As I$o$ increases, the voltage drop across diode 17 increases, which in turn increases the forward bias applied to the base 10B of transistor 10, resulting in an increase in I$r$, which in turn increases the forward bias applied to the base 12B of transistor 12, resulting in aiding the increase in I$o$. This regenerative positive feedback action continues until a quiescent condition is reached with both I$o$ and I$r$ at new values. It has been determined that the relationship between I$o$ and I$r$ can be defined by the following equation:

$$Io=Ir/K$$

where $K$ *is as previously defined.*

The use of the circuit of the invention as an impedance converter will now be illustrated with reference to FIG. 4. For this purpose, the terminal 25 is provided with a d.c. voltage source V$b$ chosen sufficiently high so as to maintain transistors 10 and 12 in their active regions, but not so high as to exceed their open base breakdown voltages. From the previously stated $Io=Ir/K$ relationship, it can be shown that the impedance $Zo$ obtained between terminals 22 and 26 in FIG. 4 when an impedance $Zr$ is connected between terminals 23 and 26 is:

$$Zo=-KZr$$

Figure 4:
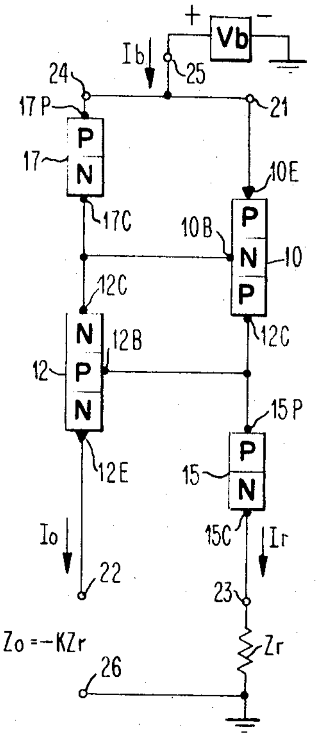
FIG. 4 illustrates the use of the circuit of the invention as an impedance converter and impedance transformer.

As an example of the above relationship, if the value of $K$ is chosen as 0.1, the circuit of FIG. 4 will convert the impedance $Zr$ to an impedance $Zo$ which is one-tenth of $Zr$. Also, since there is a "minus" in the above relationship between $Zo$ and $Zr$, the impedance $Zr$ will be transformed into its negative counterpart. Thus, resistor, inductor and capacitor circuit elements R, L and C connected to terminal 23 will respectively appear as $-KR$, $-KL$ and $-C/K$ at terminal 22. Although the impedance converter of FIG. 4 uses a circuit of the type shown in FIG. 2, it will be understood that a circuit of the type shown in FIG. 3 could also be used.

The use of the circuit of the invention as a series voltage regulator will next be illustrated with reference to FIG. 5. For such use, a d.c. voltage source V$b$ is provided as for the impedance converter of FIG. 4. Also, a reference voltage source 30 is connected to terminal 23 to provide a reference voltage V$r$ thereon, while a load R1 whose voltage V$o$ is to be regulated is connected to terminal 22. A start-up diode 33 and an overvoltage diode 37 are also provided to aid in starting up the circuit when it first receives power, and for protecting against overvoltage. It will be apparent that, when the load voltage V$o$ is negative, a like series voltage regulator could be provided using the circuit of FIG. 3. It will also be apparent that the circuit of the invention could also be used to provide a shunt voltage regulator.

Figure 5:
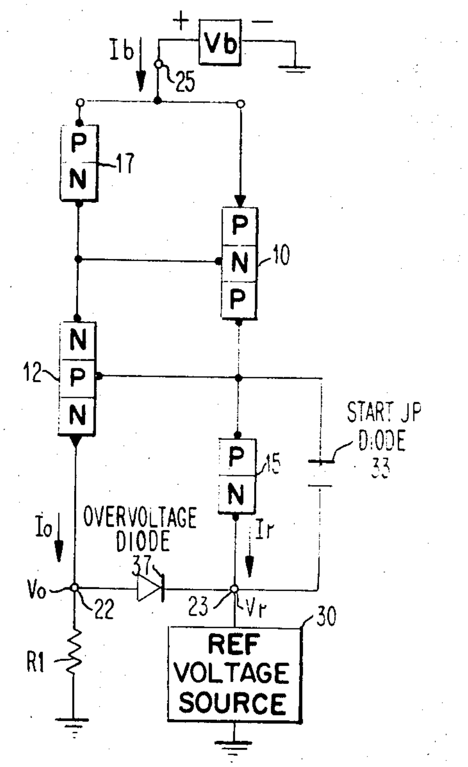
FIG. 5 illustrates the use of the circuit of the invention as a voltage regulator.

The operation of the voltage regulator of FIG. 5 is such that the current I$o$ varies in response to any change in the load R1, and in accordance with the previously defined $Io=Ir/K$ relationship, whereby the load voltage V$o$ is maintained constant. For example, if the resistance of load R1 should begin to decrease, I$o$ will begin to increase and the previously described positive regenerative feedback action will produce a resultant increase in I$o$ which will maintain V$o$ constant despite the decrease in the load R1. It will be understood that the load and reference voltages V$o$ and V$r$ will be essentially immune to variations in the voltage source V$b$, since V$b$ is in series with the relatively high collector impedances of transistors 10 and 12. It will also be understood that, because of the relatively low excursions of voltages V$b$ and V$r$, the circuit is able to operate at the highest frequency limited only by the intrinsic speed of the semiconductors. It will further be understood that, because of the $Io=Ir/K$ relationship, where K may typically be 0.1, the relatively high output current Io can be regulated by a reference voltage source 30 providing a relatively low reference current I$r$. Still further, it will be understood that by simultaneously fabricating transistor 10 and diode 17 (whose junction area determine the value of $K$) in integrated circuit form in close proximity on the same semiconductor wafer, they will have closely matched characteristics so as to provide matching over a wide operating range, as well as providing a high degree of stability and temperature insensitivity, particularly where the diode 17 is formed from a like transistor, as illustrated in FIG. 1*c*.

It is often of advantage in a voltage regulator that the load voltage V*o* be equal to the reference voltage V*r*. The difference between voltages V*o* and V*r* in FIG. 5 is determined by the offset voltage between terminals 22 and 23, which is in turn determined by the voltage drops across the PN junction of diode and the base-emitter PN junction of transistor 12. Although this offset voltage is normally small in the circuit of the invention, it can be made zero, by choosing the area of the PN base-emitter junction of transistor 12 with respect to the area of the PN junction of diode 15 so that the current densities therethrough are the same, in which case the voltage drops thereacross will be equal, resulting in $Io = Vr$. It will be understood that the current densities will be equal when the following relationship is satisfied:

$$Ir\ Io = AD2/AT2 = K$$

where $AT2$ and $AD2$ are the respective junction areas of transistor 12 and diode 15, and $Io$, $Ir$ and $K$ are as defined previously. For best matching over a wide current range, as well as a high degree of temperature insensitivity, transistor 12 and diode 15 are preferably simultaneously fabricated in integrated circuit form, with diode 15 preferably being formed from a like transistor as illustrated in FIG. 1*b*.

Figures 6, 7:
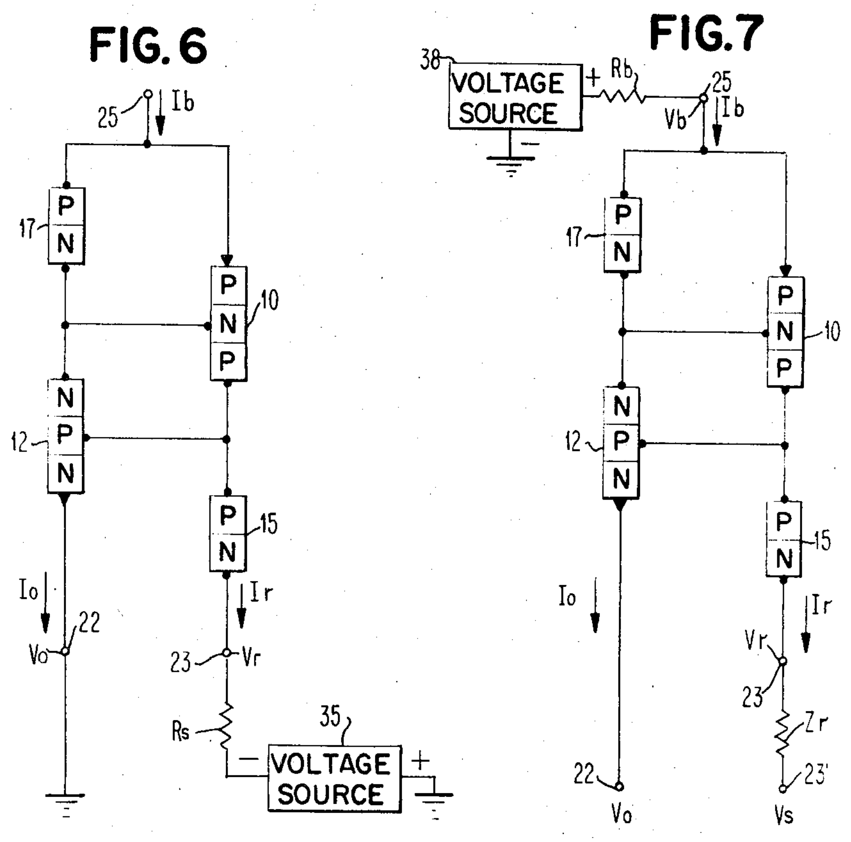
FIG. 6 illustrates the use of the circuit of the invention as a current generator.
FIG. 7 illustrates the use of the circuit of the invention as a differential amplifier.

Besides use as an impedance converter and a voltage regulator, as heretofore described, the circuit of the invention may also be advantageously used as a current generator, as illustrated in FIG. 6. For this purpose, a voltage source 35 having a source resistance R*s* is connected across terminals 22 and 23. The output current I*b* of the current generator may be represented by the following relationship:

$$Ib = Ir\frac{K+1}{K}$$

where $Ir$ $Io$ and K are as previously defined. Io can be greater or less than $Ir$, depending on $K$. In addition, the output circuit impedance will be high and comparable to the collector impedance (commonly designated $1/h_{oe}$). It will be understood from the above current relationship that the value of the current generator output current Ib can conveniently be set by appropriate choice of the source resistor R*s*. Also, by setting voltage V*o* equal to zero, V*r* will then also be zero. Furthermore, by making the current generator in integrated circuit form, highly stable temperature insensitive operation can be achieved over a wide current and temperature range.

The circuit of the invention is also of advantageous use as an amplifier, as illustrated by the differential amplifier in FIG. 7 in which the signals V*o* and V*s* whose difference ($Vo - Vs$) is to be amplified are applied to terminal 22 and 23′. An impedance Z*r* connects terminal 23′ to terminal 23, and a voltage source 38 is applied to terminal 25 via an appropriately chosen resistor R*b*. An amplified output voltage V*b* appears at terminal 25. The gain of the circuit is given by the following relationship:

$$G = \frac{Rb(1+K)}{Zo}$$

where $G$ is the gain, $Rb$ is the resistor referred to above, $K$ is as previously defined, and $Zo$ is the impedance obtained in accordance with the previously represented $Zo = -KZr$ relationship. It will be understood that, as with the other circuits described herein, advantage may be taken of integrated circuitry to achieve high stability and temperature insensitivity over a wide operating range. Also, it will be understood that the circuit of FIG. 7 permits obtaining relatively high gain with low source voltages, as is desirable, for example, for use of the circuit as an error detecting amplifier.

Figure 8:
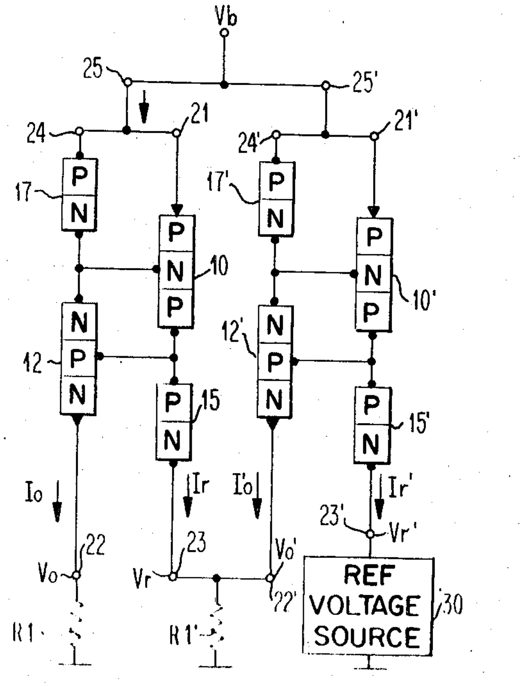
FIG. 8 illustrates how the circuit of the invention may be cascaded and the use of the cascaded arrangement as a voltage regulator.

The circuit of the invention may also be used in cascaded form as illustrated in FIG. 8 which, for example, shows the cascading of two stages for use as a voltage regulator. Primed elements in FIG. 8 correspond to one stage having a factor $K2$, and unprimed elements correspond to the other stage having a factor $K1$. A particularly advantageous cascading arrangement is one in which elements 17, 10, 17′ and 10′ are fabricated in integrated circuit form as also are elements 12, 15, 12′ and 15′ to provide close matching and tracking of their characteristics such that $K2$ of the primed stage tracks and conforms to $K1$ of the unprimed stage. The effective semiconductor junction areas in the unprimed stage are chosen, for example, $1/K$ times their corresponding effective semiconductor junction areas in the primed stage.

Operation of FIG. 8 is such that, if the load R1 should decrease, $Io$ will increase in order to maintain the load voltage $Vo$ constant, as in the voltage regulator of FIG. 5. $Vr$ serves as the load voltage $Vo'$ for the primed stage and is also maintained constant by the action of the primed stage and reference voltage source 30. The increase in $Io$ causes a corresponding increase in Ir in accordance with $Ir = K1\ Io$. Since $Vr = Vo'$ is maintained constant, $Io'$ will decrease to compensate for the increase in $Ir$, and will cause a corresponding decrease in $Ir'$ in accordance with $Ir' = K2\ Io'$.

The operation of the overall circuit shown in FIG. 8 can be described in terms of a factor $K$ which describes the relation of the load current $Io$ and the reference current $Ir'$, such that $K = Ir'/Io$. The result is that the resultant cascaded arrangement exhibits a static $K$ value which is much less dependent on temperature, fabrication deviations and other sensitivities than are the factors $K1$ $K2$ of the individual stages.

While the invention has been particularly shown and described with reference to particular preferred embodiments thereof, it will be understood by those skilled in the art that various changes in form and details may be made therein without departing from the spirit and scope of the invention.

What is claimed is:

1. A linear current translating circuit comprising
a three terminal network comprising first and second terminals defining a first current path, and a third terminal defining with said first terminal a second current path,
a first semiconductor junction transistor in said first path having its emitter connected directly to said first terminal,
a first semiconductor junction diode in said second path having one pole connected directly to said first terminal and being poled in the same sense as the emitter base junction of said first transistor, a first direct cross connection from the second pole of said first diode to the base of said first transistor, a second semiconductor junction transistor, of the opposite conductivity type than said first transistor, connected in said second path with its collector connected directly to said second pole of said first diode and its emitter connected directly to said third terminal, and having its base connected directly to the collector of said first transistor, whereby a first approximation relationship of currents in said paths is dictated by the ratio of the effective junction areas and resulting potential drops in said first diode and said first transistor emitter base junction, and a second semiconductor junction diode poled in the same sense as said emitter base junction of said second transistor and connected in said first path directly between the collector of said first transistor and said second terminal, the ratio of the area of the emitter base junction of said second transistor to the area of the diode junction of said second diode being essentially the same as the corresponding area ratio of said first diode to said first transistor, whereby the second diode and second transistor operate to maintain said second and third terminals at essentially the same potential over a wide operating range of currents in the two paths.

2. The invention in accordance with claim 1, wherein said circuit includes only semiconductors and all significant potential differences are provided by semiconductor junction drops, and said circuit is provided in integrated circuit form for uniformity of materials and ambient parameters.

3. The invention in accordance with claim 1, wherein the interconnecting means is arranged so that the relationship between the current *Io* flowing in said third terminal and the current *Ir* flowing in said second terminal is $Io=Ir/K$, $K$ being defined by the equation $$K=\frac{AT1}{AD1}a1a2\frac{1}{1+\frac{AT1}{AD1}\frac{a1}{b1}}-\frac{a2}{b2},$$

where $AT1$ and $AD1$ are respective effective junction areas of said first transistor and said first diode, $a1$ and $a2$ are the respective alphas of said first and second transistors, and $b1$ and $b2$ are the respective betas of said first and second transistors.

4. The invention in accordance with claim 3, wherein said alphas and betas are chosen so that $K$ may be approximated by the equation $$K=AT1/AD1$$

5. The combination of claim 1 with circuit means attached to the first, second and third terminals establishing a current in said first terminal which will operate the semiconductor devices at levels above cut off and below saturation and which permit the potentials at said second and third terminals to establish themselves at substantially the same level.

6. In combination, first and second semiconductor transistors of opposite polarity types, first and second semiconductor diodes, and interconnecting means coupled to said transistors and said diodes for forming a three terminal circuit providing positive regenerative feedback with respect to a change in a current flowing in a terminal of said three terminal circuit, wherein said circuit includes only semiconductors and no resistors, capacitors or inductors, wherein said transistors ad diodes are of the junction type, and wherein said interconnecting means is arrange so that the relationship between the current *Io* flowing in said terminal and the current *Ir* flowing in a second terminal is $Io=Ir/K$ $K$ being defined by the equation $$K=\frac{AT1}{AD1}a1a2\frac{1}{1+\frac{AT1}{AD1}\frac{a1}{b1}}-\frac{a2}{b2},$$

where $AT1$ and $AD1$ are respective effective junction areas of said first transistor and said first diode, $a1$ and $a2$ are the respective alphas of said first and second transistors, and $b1$ and $b2$ are the respective betas of said first and second transistors, wherein two of said circuits are connected in cascade by connection of the output terminal of the first circuit and input terminal of the second circuit to a common external constant current circuit.

7. The invention in accordance with claim 6, wherein the junction areas of the transistors and diodes of one circuit are chosen $1/k$ times the respective corresponding junction areas in the other circuit.

8. In combination, first and second transistors of opposite polarity types, each including collector, base and emitter elements, first and second semiconductor diodes, each including two elements, and interconnecting means coupled to the elements of said transistors and diodes for forming a three terminal circuit, said interconnecting means being constructed and arranged such that the collector of said first transistor is coupled to a first element of said second diode and the collector of said second transistor is coupled to a first element of said first diode, the emitter of said first transistor and a second element of said first diode are each coupled substantially directly to a first terminal of said three terminal circuit, the emitter of said second transistor is coupled to a second terminal of said three terminal circuit, and a second element of said second diode is coupled to a third terminal of said three terminal circuit, wherein said three terminal circuit comprises only semiconductors and no resistors, capacitors or inductors, wherein first and second ones of said circuits are connected in cascade, the first terminals of said circuits being coupled together and the third terminal of the first circuit being coupled to the second terminal of the second circuit.

9. The invention in accordance with claim 8, wherein a power source is coupled to said first terminals, wherein a voltage to be regulated is coupled to the second terminal of said first circuit, wherein a coupling resistor is coupled to the third terminal of said first circuit and the second terminal of said second circuit, and wherein a reference voltage source is coupled to the third terminal of said second circuit.

10. The invention in accordance with claim 9, wherein said transistors and diodes are provided integrated circuit form.

* * * * *